United States Patent [19]
Edelman et al.

[11] Patent Number: 5,865,936
[45] Date of Patent: Feb. 2, 1999

[54] RAPID CURING STRUCTURAL ACRYLIC ADHESIVE

[75] Inventors: Robert Edelman, Staten Island, N.Y.; William J. Catena, Parsippany, N.J.

[73] Assignee: National Starch and Chemical Investment Holding Corporation, Wilmington, Del.

[21] Appl. No.: 828,447

[22] Filed: Mar. 28, 1997

[51] Int. Cl.$^6$ ............................ C09J 133/06; B32B 7/12; C08F 4/26; C08F 222/02; C08F 220/18; C08F 220/28

[52] U.S. Cl. ................ 156/310; 156/331.8; 526/204; 526/318.8; 526/320; 526/328.5

[58] Field of Search ..................... 526/320, 204, 526/318.2, 328.5; 156/310, 331.8

[56] References Cited

U.S. PATENT DOCUMENTS

| | | | |
|---|---|---|---|
| 4,374,940 | 2/1983 | Bhatia . | |
| 4,380,605 | 4/1983 | Gallagher et al. | 525/14 |
| 4,430,480 | 2/1984 | Melody et al. | 525/160 |
| 4,432,829 | 2/1984 | Bachmann | 156/307.3 |
| 4,855,002 | 8/1989 | Dunn et al. | 156/307.3 |
| 4,963,220 | 10/1990 | Bachmann et al. | 156/307.3 |
| 5,318,998 | 6/1994 | Taguchi et al. | 522/24 |

FOREIGN PATENT DOCUMENTS

| | | | |
|---|---|---|---|
| 07 109 442 | 4/1995 | Japan | C09J 4/02 |
| 2 087 906 | 6/1982 | United Kingdom | C09J 3/14 |

*Primary Examiner*—Jeffrey Smith
*Assistant Examiner*—Wu C. Cheng
*Attorney, Agent, or Firm*—Jane E. Gennaro; Lydia T. McNally

[57] ABSTRACT

A two part structural acrylic adhesive contains as a first part a mixture of acrylate or methacrylate monomers or oligomers, maleic acid, a hydroperoxide, and a source of ferric ions, and as a second activator part a substituted dihydropyridine. The adhesive is fast-curing and stable.

16 Claims, No Drawings

RAPID CURING STRUCTURAL ACRYLIC ADHESIVE

FIELD OF THE INVENTION

This invention relates to a two-part acrylic structural adhesive that is fast-curing.

BACKGROUND OF THE INVENTION

Structural acrylic adhesive systems typically are two-part systems composed of an activator and an adhesive, each applied to a separate substrate. On assembly, the activator and adhesive mix to generate radicals that in turn cure the acrylates or methacrylates present in the system. These acrylate or methacrylate monomers may contain a urethane backbone to impart increased flexibility and adhesion.

Typically, the activator will contain an amine reductant, such as a butyraldehyde/aniline adduct or a dihydropyridine. The adhesive will usually contain a peroxide as the oxidant. Such systems will give an adhesive fixing time of about one minute.

There has always been a need to increase the cure speed of these acrylic adhesives to achieve faster fixing times. One such adhesive is described, for example, in U.S. Pat. No. 4,432,829, issued 21 Feb. 1984 to Bachmann. This reference discloses an adhesive composition comprising, preferably, an activator part and an acrylic adhesive and a catalyst system part. The catalyst system comprises an aromatic perester free-radical precursor, maleic acid, and a transition metal cure accelerator to provide metal ions in an oxidized valence state. The activator is an amine/aldehyde adduct.

As is recognized in this reference, a difficulty commonly encountered in attempts to produce fast-acting adhesives is the tendency of the composition to cure prematurely. This is believed to be the reason the compositions in this reference utilize a perester free-radical precursor, and specifically avoid the use of hydroperoxides. The perester is more stable in the presence of transition transition metal ions, and consequently any premature gelling or curing is allegedly minimized. A further consequence of using the perester and not the hydroperoxide, however, is the loss of some rapidity of cure.

Thus, there is still a demand for adhesive formulations capable of rapidly developing high levels of adhesion, and particularly for those that do not cure prematurely.

SUMMARY OF THE INVENTION

This invention arises from the discovery that a stable structural adhesive can be formed containing a hydroperoxide and ferric ions, which are added in the form of an organic salt. This adhesive composition is obtained by providing a mixture comprising acrylate or methacrylate monomers or acrylated or methacrylated oligomers and maleic acid, then thoroughly chelating all transition metal ions present in this mixture, and finally by adding the hydroperoxide and ferric salts to this chelated mixture. The resultant adhesive is unexpectedly stable, but rapidly reactive when mixed with an activator.

This stability is unexpected because it is thought that various mechanisms exist by which the ferric ion can be reduced to ferrous ion. Ferrous ion reacts with the hydroperoxide to generate initiating radicals, which rapidly cause polymerization. Maleic acid, a fairly strong acid, accelerates the reaction of hydroperoxide into initiating radicals. Nevertheless, the compositions of this invention are not only room temperature stable, but remain stable even after ten days at 50° C.

The reasons for this stability are not completely understood, but it is possible that the primary route to reduction of ferric to ferrous ion comes from other transition metal ions that may be present in the acrylate and methacrylate mixture, and that are now effectively removed from the reaction by chelation.

Thus, this invention is a two-part structural acrylic adhesive composition consisting of an adhesive part and an activator part. The adhesive first part comprises a mixture of acrylate or methacrylate monomers or acrylated or methacrylated oligomers, an acrylate or methacrylate hydroxyl-containing monomer, optionally acrylic acid or methacrylic acid, maleic acid, a hydroperoxide, and a source of ferric ions; the adhesive first part characterized in that an effective amount of chelating agent is added in a sufficient amount to chelate, and heat is applied at a temperature in the range of 40° to 70° C. for a period of time sufficient to chelate, substantially all transition metal ions that may be present, the adhesive first part then being cooled to at least room temperature, before the addition of the hydroperoxide and the source of ferric ions. The adhesive part may optionally contain any desired additives to impart predetermined properties to the adhesive, for example, thickeners, thixotropic agents and adhesion promoters. These additives are added before the mixture is subjected to chelation. The activator second part comprises a substituted dihydropyridine, which may be dissolved in an acrylate or methacrylate monomer or oligomer, which may or may not be one used in the adhesive part of the adhesive.

The adhesive part of the two part adhesive system is prepared by the sequential steps of (a) providing a mixture of one or more acrylate or methacrylate monomers or acrylated or methacrylated oligomers, a hydroxyl-containing acrylate or methacrylate monomer, optionally acrylic acid or methacrylic acid, maleic acid, and optionally any desired additives to impart predetermined properties to the adhesive; (b) chelating any transition metal ions present in the mixture; and (c) adding hydroperoxide and a source of ferric ions after the chelation. The mixture is chelated by adding an effective amount of a chelating agent to chelate any transition metal ions present, and heating for several hours until substantially all metallic ions that may be present in the mixture are chelated.

In another embodiment, this invention is a method for making the above described two-part adhesive system comprising (a) providing a mixture of one or more acrylate or methacrylate monomers or oligomers, a hydroxyl-containing acrylate or methacrylate monomer, maleic acid, optionally acrylic acid or methacrylic acid, and optionally any desired additives to impart predetermined properties to the adhesive; (b) adding a sufficient amount of a chelating agent to chelate substantially all transition metal ions that may be present, and heating until substantially all transition metal ions present in the mixture are chelated; (c) cooling the mixture at least to room temperature, (d) adding hydroperoxide and ferric ions to the mixture after the chelation step; and (e) providing an activator second part consisting of a substituted dihydropyridine.

In a further embodiment, this invention is a method of bonding two substrates in which the first part adhesive is applied to one substrate, and the second part activator is applied to a second substrate, and the substrates are then joined.

DETAILED DESCRIPTION OF THE INVENTION

In the adhesive first part of the composition, suitable acrylate or methacrylate monomers are the tetraethyleneglycol, isodecyl, hydroxyethyl, and hydroxypropyl esters of acrylic acid and methacrylic acid; the butyl, isodecyl, methyl, tetrahydrofurfuryl, isobornyl, and 2-ethylhexyl esters of acrylic and methacrylic acid; diacrylates, dimethacrylates, triacrylates, trimethacrylates, tetracrylates and tetramethacrylates of butyleneglycol, tetraethyleneglycol, polyethylene glycol, bisphenol A, ethoxylated bisphenol A, pentaerythritol, and the like.

Suitable acrylated or methacrylated oligomers can be prepared from a wide range of materials provided they have adhesive properties appropriate to the desired end use, and have acrylate or methacrylate functionality. Such oligomers are known and used in the art. Particularly suitable acrylated or methacrylated oligomers are those having a polyurethane backbone capped with acrylate functionality, such as, for example, those formed by the reaction of a polyester polyol or poly(alkylene oxide) polyol with an excess of diisocyanate, and then further reacted with a hydroxyl containing acrylate or methacrylate, such as, hydroxyethyl acrylate. Such oligomers are hereinafter referred to as urethane/acrylate oligomers or acrylated or methacrylated oligomers.

Suitable diisocyanates are toluene-2,4-diisocyanate, 4.4'-methylene-bis(cyclohexylisocyanate), hexamethylene-1,6-diisocyanate, diphenyl-methane- 4,4'-diisocyanate, and isophorone diisocyanate.

Suitable polyester polyols are those formed by the reaction of lactones or carboxylic acids with poly-functional hydroxy compounds using methods known in the art. An example of a suitable lactone is caprolactone. Examples of suitable carboxylic acids are succinic acid, adipic acid, suberic acid, azelaic acid, sebacic acid, phthalic acid, isophthalic acid, and terephthalic acid. Examples of suitable hydroxy compounds are ethylene glycol, diethylene glycol, 1,4-butanediol, 1,3-propanediol, 1,6-hexanediol, trimethylolpropane, glycerol, erythritol, pentaerythritol, poly(ethyleneoxide) diol, poly(ethyleneoxide/propyleneoxide)diol, poly(tetramethyleneoxide)diol, 1,6-hexanediol-isophtalate diol, 1,6-hexanediol-adipate diol, and 1,6-hexanediol-ethylene glycol-adipate diol.

Poly(alkyleneoxide) polyols are normally obtained from the polymerization, including block copolymerization, of cyclic ethers, such as alkylene oxides, dioxolane and tetrahydrofuran, the condensation of glycols, or the condensation of cyclic ethers with glycols. They are well-known and commercially available, and are also called polyalkylene ether glycols, polyalkylene glycols, polyalkylene oxide glycols, polyglycols and polyoxyalkylene glycols. These compounds are represented by the formula $HO(RO)_nH$, in which R is an alkylene radical and n is at least 2. The alkylene radical can be a single chain or cn consist of two or more alkylene chains separated from each other by an ether oxygen atom. Preferred poly(alkylene oxide) polyols have from 1–9, preferably 1–6, carbon atoms in the alkylene chain separating each pair of oxygen atoms and have a number average molecular weight in the range of from about 100 to about 4000, preferably about 100 to about 2500. Not all the alkylene units need be the same.

Suitable hydroxyl containing acrylic monomers are hydroxyethyl methacrylate and hydroxypropyl methacrylate, and are present in an amount of 20 to 50% by weight of the adhesive part. Acrylic or methacrylic acid optionally may be present, and if present will be in an amount of 1 to 20% by weight of the adhesive first part of the composition.

The maleic acid will be present in an amount of 0.5 to 5% by weight of the adhesive first part of the composition.

Suitable hydroperoxides are cumene hydroperoxide, and t-butyl hydroperoxide. The hydroperoxides are present in an effective amount, which typically is in the range of 0.25 to 1.5 percent by weight of the adhesive part of the composition, preferably about 0.5 weight percent.

Additives, such as those commonly used in adhesive formulations, may also be included in the adhesive part. Such additives may be thickeners, such as polyalkyl($C_1$–$C_4$) methacrylates, bis(phenol A fumarate); adhesion promoters, such as gamma-methacryloxypropyltrimethoxysilane and vinyl tris-(w-methoxyethoxy)silane; and thixotropic agents, such as treated or untreated fumed silica.

The chelating agents that can be used are salts of ethylenediaminetetraacetic acid, preferably the diammonium salt.

The chelation is performed by adding about 0.01 to 0.05 parts of the chelating agent to 100 parts of the adhesive first part of the composition. This mixture is heated to a temperature within the range of 40° to 70° C., preferably within the range of 60° to 65° C., until substantially all the transition metal ions that may be present in the mixture are chelated. Depending on the temperature, the time until chelation of substantially all the transition metal ions is accomplished will be in the range of about 4 to 24 hours, it being understood that the higher the temperature used, the shorter the time that will be needed. Thus, at a preferred temperature of about 65° C., the time for chelation to occur will be in the range of 4 to 8 hours. After heating for the appropriate time and at an effective temperature for chelation, the mixture is then cooled to room temperature. The mixture may also be cooled to a lower temperature, but it is not necessary, the purpose being to lower the temperature sufficiently to avoid chelation of the ferric ions that are to be added.

The ferric ions are added after the chelation and after the cooling to room temperature, in the form of a soluble organic salt, such as ferric naphthenate or octoate, and in amounts such that ferric ion is present at a level of from 1 to 100 parts per million in the adhesive part of the composition.

The hydroperoxide is also added after the chelation in amounts of 0.25 to 1.5% by weight of the adhesive part.

The activator part of the adhesive composition comprises a substituted dihydropyridine, such as, 3,5-diethyl-1,2-dihydro-1-phenyl-2-propyl-pyridine, or an impure version of this material such as a butyraldehyde/aniline condensate (such as is sold under the trademark VANAX 808 by R.T. Vanderbilt Company), provided in an amount of 5 to 30% by weight in an acrylate or methacrylate monomer or oligomer such as those described above. The activator is used at a ratio of adhesive part to activator part in the range of 10:1 to 40:1.

In a preferred embodiment, the two-part adhesive composition comprises: as a first part (i) a mixture of 40 to 60 parts by weight of a urethane/acrylate oligomer, (ii) 15 to 35 parts by weight of hydroxyethyl methacrylate, (iii) 0.5 to 5 parts by weight of maleic acid, (iv) 0.175 to 1.1 parts by weight of weight cumene hydroperoxide, (v) 0.5 to 1.0 part by weight of 8% ferric octoate, (vi) optionally, up to 5 parts by weight of additives selected from the group consisting of thickeners, thixotropic agents, and adhesion promoters, the first part mixture characterized in that about 0.01 to 0.05 part by weight of the diammonium salt of ethylenediaminetetraacetic acid is added to 100 parts by weight of the mixture of the first part, and heated to 65° C. for up to 16 hours before the addition of the hydroperoxide and the ferric octoate; and as a second part: One part by weight of a mixture of 15% by weight of 3,5-diethyl-1,2-dihydro-1-phenyl-2-propyl-pyridine and 85% by weight of isobornyl methacrylate, per 20 to 40 parts by weight of the first part mixture.

EXAMPLES

Example 1

This example shows the faster curing time and stability achieved by a formulation of this invention, Example C, compared to formulations that are not obtained by chelation followed by addition of hydroperoxide and ferric ion. In Example B, the absence of ferric ion produces a stable but slow curing material. In Example A, neither fast cure nor stability is achieved. These adhesive formulations were cured with an activator consisting of 3,5-diethyl-1,2-dihydro-1-phenyl-2-propyl-pyridine in isobornyl methacrylate.

| Formulation in parts by weight | A | B | C |
|---|---|---|---|
| urethane acrylate oligomer | 48 | 48 | 48 |
| maleic acid | 1 | 1 | 1 |
| isobornyl acrylate | 25 | 25 | 25 |
| hydroxyethyl methacrylate | 25 | 25 | 25 |
| diammonium salt of ethylenediaminetetraacetic acid | — | 0.02 | 0.02 |
| 70% cumene hydroperoxide | 1 | 1 | 1 |
| ferric octoate | — | — | 0.08 |
| Performance Results | | | |
| curing time in seconds | >30 | >30 | <15 |
| 15' lap shear strength on steel, psi | 500 | 500 | 1500 |
| stability after exposure to 50° C. for 10 days | polymer formed | no polymer | no polymer |

Example 2

This example shows the stability of sample C from Example 1. The sample was tested for lap shear strength on steel after aging for 10 days at 50° C. after curing for 15 minutes and also for 24 hours. The results are presented in the following table and show excellent stability evidenced by no substantial difference in lap shear strength on steel between unaged and aged products. Fast cure is still obtained as shown by the high lap shear strength on steel in 15 minutes.

| Unaged | Aged 10 days at 50° C. |
|---|---|
| Cured 15 minutes | Cured 15 minutes |
| Lap shear strength on steel 1650 psi | Lap shear strength on steel 1550 psi |
| Cured 24 hours | Cured 24 hours |
| Lap shear strength on steel 3250 psi | Lap shear strength on steel 3217 psi |

We claim:

1. A two-part structural adhesive composition comprising:
   (a) an adhesive first part comprising:
      (i) one or more acrylate or methacrylate monomers or acrylated or methacrylated oligomers,
      (ii) a hydroxyl-containing acrylate or methacrylate monomer,
      (iii) optionally, acrylic acid or methacrylic acid,
      (iv) maleic acid,
      (v) optionally, additives selected from the group consisting of thickeners, thixotropic agents, and adhesion promoters,
      (vi) a hydroperoxide, and
      (vii) a soluble ferric organic salt as a source of ferric ions,
      the adhesive first part characterized in that an effective amount of chelating agent is added in a sufficient amount to chelate, and heat is applied to a temperature in the range of 40° to 70° C. for a period of time sufficient to chelate, substantially all transition metal ions that may be present, the adhesive first part then being cooled to at least room temperature, before the addition of the hydroperoxide and the source of ferric ions;
   (b) an activator second part comprising:
      a substituted dihydropyridine, which may be dissolved in an acrylate or methacrylate monomer, which may or may not be one used in the adhesive first part of the composition.

2. The two-part structural adhesive composition according to claim 1 in which the hydroxyl containing monomer is selected from the group consisting of hydroxyethyl acrylate or methacrylate, and hydroxypropyl acrylate or methacrylate, present in an amount of 20 to 50% by weight of the adhesive first part.

3. The two-part structural adhesive composition according to claim 1 in which the maleic acid is present in an amount of 0.5 to 5% by weight of the adhesive first part.

4. The two-part structural adhesive composition according to claim 1 in which acrylic or methacrylic acid is present in an amount of 1 to 20% by weight of the adhesive first part.

5. The two-part structural adhesive composition according to claim 1 in which the hydroperoxide is selected from the group consisting of cumene hydroperoxide and t-butyl hydroperoxide and is present in an amount of 0.175 to 1.1% by weight of the adhesive first part.

6. The two-part structural adhesive composition according to claim 1 in which the substituted dihydropyridine is 3,5-diethyl-1,2-dihydro-1-phenyl-2-propyl pyridine.

7. The two-part structural adhesive composition according to claim 1 in which the chelating agent is the diammonium salt of ethylene-diaminetetraacetic acid, and is added in an amount of 0.01–0.05 parts by weight to 100 parts by weight of the adhesive first part of the composition.

8. A two-part structural adhesive composition comprising:
   (a) an adhesive first part comprising:
      (i) 40 to 60 parts by weight of a polyurethane acrylate
      (ii) 15 to 35 parts by weight of hydroxyethyl methacrylate,
      (iii) 0.5 to 5 parts by weight of maleic acid,
      (iv) 0.175 to 1.1 parts by weight of weight cumene hydroperoxide,
      (v) 0.5 to 1.0 part by weight of 8% ferric octoate,
      (vi) optionally, up to 5 parts by weight of additives selected from the group consisting of thickeners, thixotropic agents, and adhesion promoters,
      the adhesive first part characterized in that 0.01 to 0.05 parts by weight of the diammonium salt of ethylene-diaminetetraacetic acid are added to 100 parts by weight of the adhesive first part, the first part is heated to a temperature in the range of 40° to 70° C. for a period of time sufficient to chelate substantially all the transition metal ions that may be present, and cooled to at least room temperature, before the addition of the hydroperoxide and the ferric octoate;
   (b) as a second activator part:
      1 part by weight of a mixture of 15% by weight of 3,5-diethyl-1,2-dihydro-1-phenyl-2-propyl-pyridine and 85% by weight of isobornyl methacrylate, per 20–40 parts by weight of the adhesive first part of the composition.

9. A method of preparing a two-part structural adhesive composition comprising the sequential steps of:

(a) providing a first adhesive part comprising:
   (i) one or more acrylate or methacrylate monomers or acrylated or methacrylated oligomers,
   (ii) a hydroxyl-containing acrylate or methacrylate monomer,
   (iii) maleic acid,
   (iv) optionally acrylic or methacrylic acid, and
   (v) optionally additives selected from the group consisting of thickeners, thixotropic agents, and adhesion promoters;
(b) adding a chelating agent to the mixture and heating at a temperature in the range of 40° to 70° C. for a period of time until substantially all transition metal ions that may be present in the adhesive first part are chelated;
(c) cooling the adhesive first part at least to room temperature;
(d) adding a hydroperoxide and source of ferric ions to the adhesive first part after the chelation step; and
(e) providing an activator second part consisting of a substituted dihydropyridine.

10. The method according to claim 9 in which the hydroxyl containing monomer is selected from the group consisting of hydroxyethyl acrylate or methacrylate, and hydroxypropyl acrylate or methacrylate, present in an amount of 20 to 50% by weight of the adhesive first part of the composition.

11. The method according to claim 9 in which the maleic acid is present in an amount of 0.5 to 5% by weight of the adhesive first part of the composition.

12. The method according to claim 9 in which acrylic or methacrylic acid is present in an amount of 1 to 20% by weight of the adhesive first part of the composition.

13. The method according to claim 9 in which the hydroperoxide is selected from the group consisting of cumene hydroperoxide and t-butyl hydroperoxide and is present in an amount of 0.175 to 1.1% by weight of the adhesive first part of the composition.

14. The method according to claim 9 in which the substituted dihydropyridine is 3,5-diethyl-1,2-dihydro-1-phenyl-2-propyl pyridine.

15. The method according to claim 9 in which the chelating agent is the diammonium salt of ethylenediaminetetraacetic acid, and is added in an amount of 0.01 to 0.05 parts by weight to 100 parts by weight of the adhesive first part of the composition.

16. A method of adhering two substrates using a two-part structural adhesive composition comprising:
   (a) applying to the first substrate a mixture comprising:
      (i) acrylate or methacrylate monomers or acrylated or methacrylated oligomers,
      (ii) a hydroxyl-containing acrylate or methacrylate monomer,
      (iii) optionally acrylic acid or methacrylic acid,
      (iv) maleic acid,
      (v) optionally additives selected from the group consisting of thickeners, thixotropic agents, and adhesion promoters
      (vi) a hydroperoxide,
      (vii) a soluble ferric organic salt as a source of ferric ions;
   the adhesive first part characterized in that an effective amount of chelating agent is added in a sufficient amount to chelate, and heat is applied to a temperature in the range of 40° to 70° C. for a period of time sufficient to chelate, substantially all transition metal ions that may be present, the adhesive first part then being cooled to at least room temperature, before the addition of the hydroperoxide and the source of ferric ions,
   (b) applying to the second substrate an activator second part comprising a substituted dihydropyridine, which may be dissolved in an acrylate or methacrylate monomer, which may or may not be one used in the first part of the adhesive; and
   (c) joining the substrates together.

* * * * *